(12) United States Patent
Shionozaki et al.

(10) Patent No.: US 10,540,805 B2
(45) Date of Patent: Jan. 21, 2020

(54) CONTROL OF DISPLAY OF COMPOSITE IMAGE BASED ON DEPTH INFORMATION

(71) Applicant: SONY CORPORATION, Tokyo (JP)

(72) Inventors: Atsushi Shionozaki, Tokyo (JP); Junichi Rekimoto, Kanagawa (JP); Hiroshi Goto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/193,388

(22) Filed: Jun. 27, 2016

(65) Prior Publication Data

US 2016/0307361 A1    Oct. 20, 2016

Related U.S. Application Data

(63) Continuation of application No. 13/684,949, filed on Nov. 26, 2012, now Pat. No. 9,406,139.

(30) Foreign Application Priority Data

Dec. 2, 2011 (JP) ................................ 2011-264444

(51) Int. Cl.
*G06T 15/20* (2011.01)
*G06T 19/20* (2011.01)
*G06F 3/01* (2006.01)
*G06F 3/16* (2006.01)
*G06T 15/50* (2011.01)

(52) U.S. Cl.
CPC ............ *G06T 15/205* (2013.01); *G06F 3/011* (2013.01); *G06F 3/16* (2013.01); *G06T 15/503* (2013.01); *G06T 19/20* (2013.01); *G06T 2207/10028* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 6,333,740 B1 * | 12/2001 | Kojima | G06T 15/00 345/419 |
| 6,747,642 B1 | 6/2004 | Yasumoto | |
| 7,646,394 B1 * | 1/2010 | Neely, III | G06F 3/011 345/419 |
| 7,889,913 B2 | 2/2011 | Wells | |
| 8,295,648 B2 * | 10/2012 | Dohta | A63F 13/00 345/422 |
| 8,411,113 B1 | 4/2013 | Cornell et al. | |
| 8,514,225 B2 | 8/2013 | Genova | |
| 8,717,405 B2 * | 5/2014 | Li | H04N 7/15 348/14.08 |
| 8,803,875 B2 * | 8/2014 | Tamaru | H04N 13/0022 345/419 |

(Continued)

FOREIGN PATENT DOCUMENTS

JP    2006-128754 A    5/2006

*Primary Examiner* — Michelle M Entezari
(74) *Attorney, Agent, or Firm* — Chip Law Group

(57) ABSTRACT

There is provided an image processing device including a depth acquisition unit configured to acquire depth information of an object included in a captured image, an image combining unit configured to combine the object with an image object having depth information according to each piece of the depth information, and an effect processing unit configured to execute effect processing according to the depth information of the object.

12 Claims, 10 Drawing Sheets

(56) References Cited

U.S. PATENT DOCUMENTS

| | | |
|---|---|---|
| 8,866,841 B1 | 10/2014 | Distler |
| 8,994,716 B2* | 3/2015 | Malik .................. H04N 13/111 345/419 |
| 9,558,595 B2* | 1/2017 | Liu ........................ G06T 19/20 |
| 9,883,120 B2* | 1/2018 | Adsumilli .............. H04N 5/272 |
| 2005/0001853 A1 | 1/2005 | O'Donnell et al. |
| 2006/0031776 A1 | 2/2006 | Glein |
| 2006/0214924 A1 | 9/2006 | Kawamoto |
| 2008/0002910 A1 | 1/2008 | Ojima et al. |
| 2008/0225007 A1* | 9/2008 | Nakadaira ........... G06F 3/03545 345/173 |
| 2009/0142041 A1 | 6/2009 | Nagasawa et al. |
| 2010/0074594 A1 | 3/2010 | Nakamura et al. |
| 2010/0103311 A1 | 4/2010 | Makii |
| 2010/0188572 A1 | 7/2010 | Card, II |
| 2011/0007135 A1 | 1/2011 | Okada et al. |
| 2011/0050864 A1* | 3/2011 | Bond ...................... G06T 7/579 348/51 |
| 2011/0169825 A1 | 7/2011 | Ishiyama et al. |
| 2011/0181588 A1 | 7/2011 | Barenbrug |
| 2011/0181591 A1 | 7/2011 | Benitez et al. |
| 2011/0228100 A1* | 9/2011 | Yahagi .................... G06T 7/593 348/169 |
| 2011/0234791 A1* | 9/2011 | Miyashita ............... G06F 3/011 348/139 |
| 2011/0249888 A1 | 10/2011 | Caceres et al. |
| 2012/0051631 A1* | 3/2012 | Nguyen .................... G06K 9/38 382/164 |
| 2012/0070070 A1 | 3/2012 | Litvak |
| 2012/0106791 A1 | 5/2012 | Lim |
| 2012/0188098 A1* | 7/2012 | Mochizuki ............. G08G 1/161 340/905 |
| 2013/0023730 A1* | 1/2013 | Kitamura ........... A61B 1/00009 600/104 |
| 2013/0127823 A1 | 5/2013 | Diverdi et al. |
| 2013/0162643 A1 | 6/2013 | Cardle |
| 2014/0133837 A1* | 5/2014 | Mate .................... G11B 27/031 386/278 |

\* cited by examiner

FIG. 2
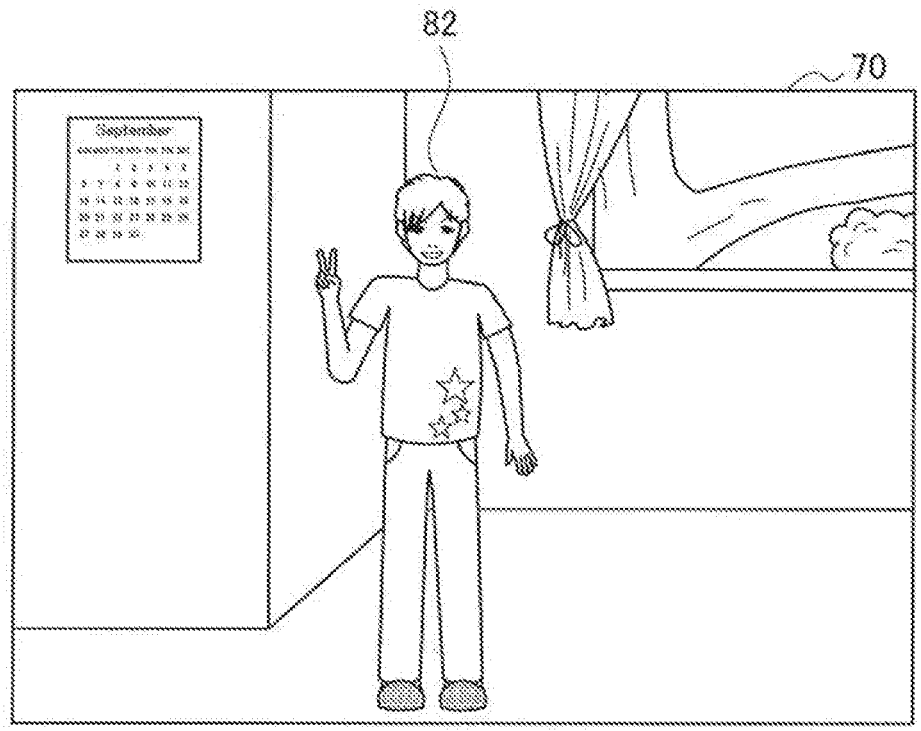
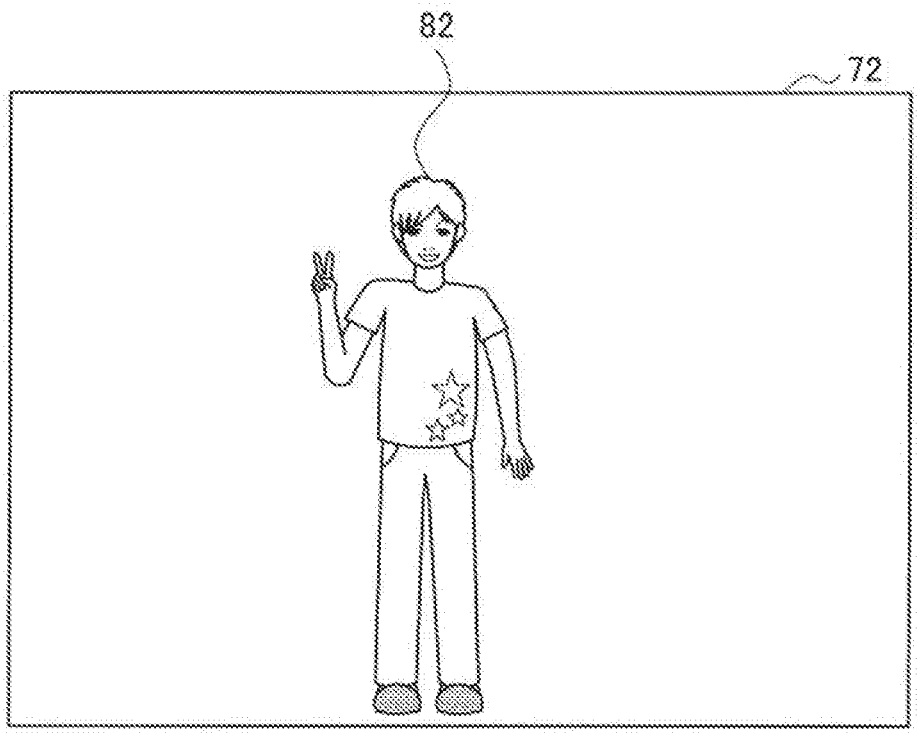

CONTROL OF DISPLAY OF COMPOSITE IMAGE BASED ON DEPTH INFORMATION

CROSS-REFERENCE TO RELATED APPLICATIONS

The present application is a continuation application of U.S. patent application Ser. No. 13/684,949, filed Nov. 26, 2012, which claims the benefit of priority from prior Japanese Patent Application JP 2011-264444, filed Dec. 2, 2011, the entire content of which is hereby incorporated by reference.

BACKGROUND

The present disclosure relates to an image processing device and an image processing method.

Recently, image processing devices that process captured images have been widely spread. For example, an image processing device that extracts an object from a captured image and combines the object with another image object is disclosed in Japanese Patent Application Publication No. 2006-128754.

SUMMARY

When the object is combined with another image object as described above, it is desirable that the object be in an appropriate range for the other image object. For example, when the image object is an image object of a celebrity, it is desirable that a depth of the object be close to a depth of the image object of the celebrity so that the object is viewed along with the celebrity.

However, it may be difficult to recognize whether or not the object is in the appropriate depth range for the image object just at a glance of a composite image of the object and the image object. For example, when there is a small object at a shallow depth and when there is a large object at a deep depth, it is difficult to determine whether or not the object is in the appropriate depth range according to a size of the object in the composite image because there is no large difference in the size of the object in the composite image.

It is desirable to provide a novel and improved image processing device and image processing method that can provide notification so that it can be easily determined whether or not an object is in an appropriate range.

In accordance with an embodiment of the present disclosure, there is provided an image processing device including a depth acquisition unit configured to acquire depth information of an object included in a captured image, an image combining unit configured to combine the object with an image object having depth information according to each piece of the depth information, and an effect processing unit configured to execute effect processing according to the depth information of the object.

In accordance with another embodiment of the present disclosure, there is provided an image processing method including acquiring depth information of an object included in a captured image, combining the object with an image object having depth information according to each piece of the depth information, and executing effect processing according to the depth information of the object.

In accordance with the embodiments of the present disclosure described above, notification can be provided so that it can be easily determined whether or not an object is in an appropriate range.

BRIEF DESCRIPTION OF THE DRAWINGS

FIG. 2 is an explanatory diagram illustrating the extraction of a human image from a captured image;

DETAILED DESCRIPTION OF THE EMBODIMENT(S)

Figure 1:
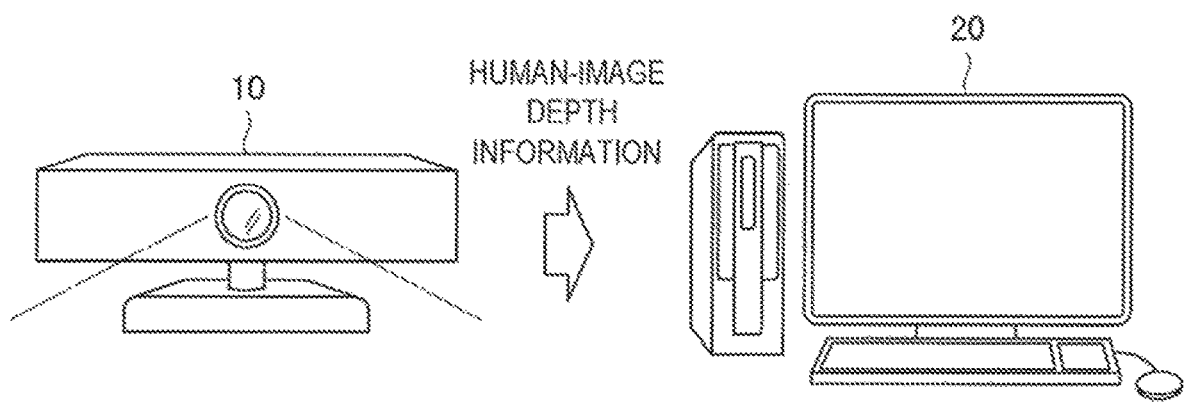
FIG. 1 is an explanatory diagram illustrating a configuration of an image processing system in accordance with an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in this specification and the drawings, a plurality of structural elements having substantially the same function and structure may be distinguished by adding different letters after the same reference numerals. However, when it is not necessary to particularly distinguish the plurality of structural elements having substantially the same function and structure, the plurality of structural elements are denoted by the same reference numeral only.

In addition, description of the present disclosure will be given in the order of following items.

1. Basic Configuration of Image Processing System
2. Configuration of Image Processing Device
3. Operation of Image Processing System
4. Hardware Configuration
5. Conclusion

[1. Basic Configuration of Image Processing System]

Technology by the present disclosure can be practiced in various forms as will be described hereinafter as one example. In addition, an image processing device in accordance with the embodiment of the present disclosure includes:

A. a depth acquisition unit (a communication unit 220) configured to acquire depth information of an object included in a captured image;

B. an image combining unit (an image combining unit 250) configured to combine the object with an image object having depth information according to each piece of the depth information; and C. an effect processing unit 260 configured to execute effect processing according to the depth information of the object.

Hereinafter, first, the basic configuration of the image processing system including the above-described image processing device will be described with reference to FIGS. 1 to 3.

FIG. 1 is an explanatory diagram illustrating the configuration of the image processing system in accordance with an embodiment of the present disclosure. As illustrated in FIG. 1, the image processing system in accordance with the embodiment of the present disclosure includes an imaging device 10 and an image processing device 20.

(Imaging Device)

The imaging device 10 images an object to acquire a captured image. Specifically, the imaging device 10 includes an imaging optical system such as an imaging lens or a zoom lens and an imaging element such as a charge coupled device (CCD) or a complementary metal oxide semiconductor (CMOS).

The imaging optical system forms an object image on an imaging plane of the imaging element by condensing light emitted from the object. The imaging element converts the object image formed by the imaging optical system into an electrical image signal. Here, the imaging element includes a red (R) component light-receiving element, a green (G) component light-receiving element, and a blue (B) component light-receiving element. The captured image including RGB information is obtained according to a function of each light-receiving element.

In addition, the imaging device 10 in accordance with the embodiment of the present disclosure acquires depth information indicating a distance between the imaging device 10 and the object. This depth information can be acquired in units of pixels in the captured image.

Further, the imaging device 10 extracts an image part of the object by recognizing the object from the captured image based on the above-described depth information. For example, the imaging device 10 extracts a human image from the captured image based on the depth information, human skeleton information, and the like. The imaging device 10 transmits the extracted human image to the image processing device 20 along with the depth information. Hereinafter, this point will be specifically described with reference to FIG. 2.

FIG. 2 is an explanatory diagram illustrating the extraction of a human image from a captured image. The captured image 70 illustrated in FIG. 2 includes the human image 82 and a background image. Here, because there is a depth difference between a region of the human image 82 and a region of the background image, the imaging device 10 may extract candidates for the human image based on a depth distribution of each pixel of the captured image 70, and further determine a candidate consistent with a human skeleton pattern as the human image. Thereby, as in a processing image 72 illustrated in FIG. 2, the human image 82 can be extracted from the captured image 70.

Although an example in which the object is a human in this specification will be described, the object is not limited to the human. For example, the object may be another object like a flower or an animal. In addition, although an example in which the human image is extracted from the captured image based on the depth information has been described above, the human image can be extracted according to image recognition of a pattern matching a human.

(Image Processing Device)

The image processing device 20 receives a human image and depth information of the human image from the imaging device 10, and combines the human image with another image object using the depth information. For example, the image processing device 20 combines a background image and a foreground image with the human image. Hereinafter, this point will be specifically described with reference to FIG. 3.

Figure 3:
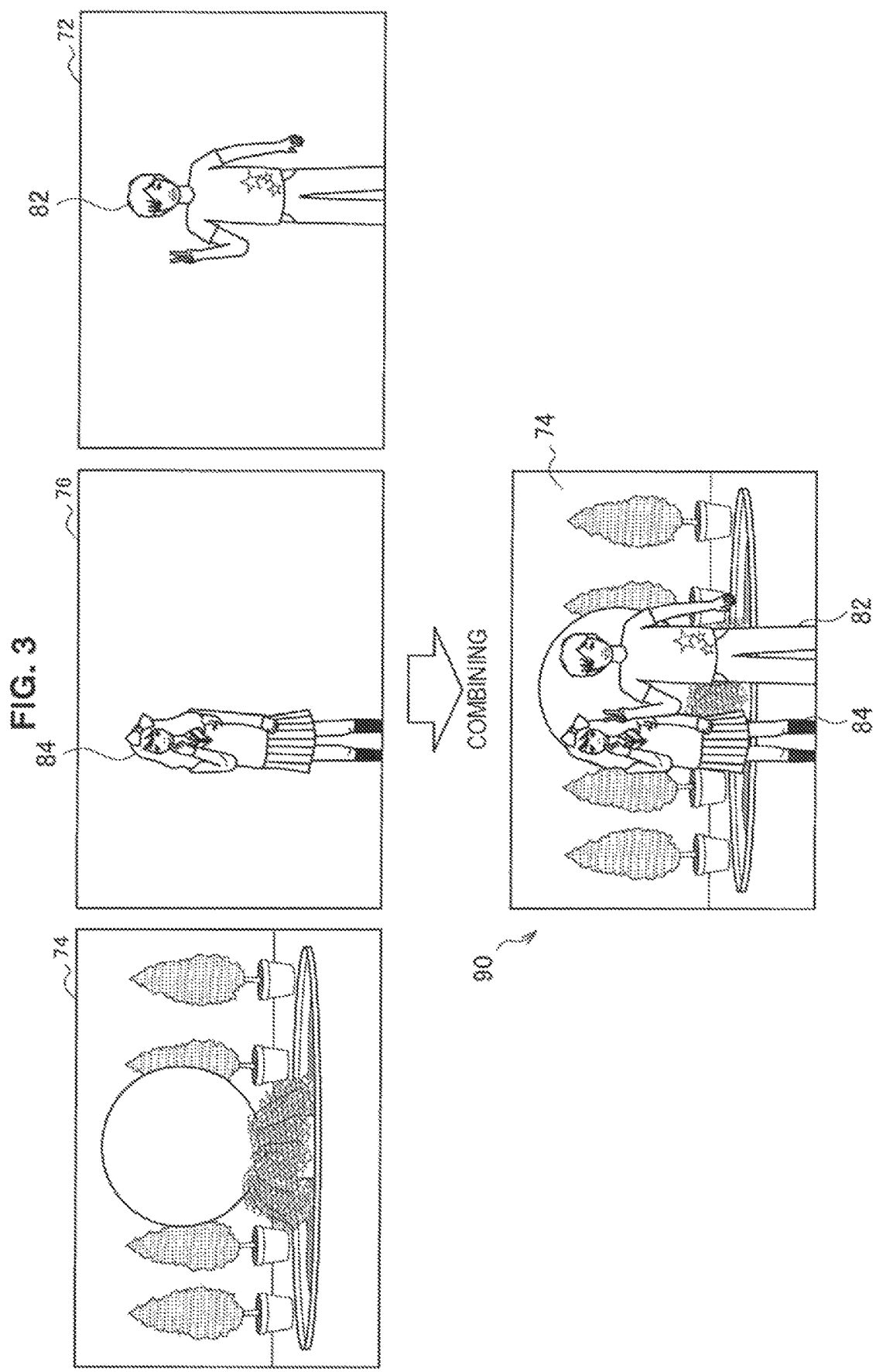
FIG. 3 is an explanatory diagram illustrating a combining process for the human image.

FIG. 3 is an explanatory diagram illustrating a combining process for a human image. As illustrated in FIG. 3, the image processing device 20 generates a composite image 90 by combining a background image 74, a foreground image 76 including a celebrity as a foreground object 84, and a processing image 72 including a human image 82. Here, because the foreground object 84 has depth information, the image processing device 20 can express an anteroposterior relationship between the foreground object 84 and the human image 82 based on depth information of the foreground object 84 and the human image 82.

As described above, it is possible to obtain a composite image as if a human is in another space by combining the human imaged by the imaging device 10 with another image object.

Although a personal computer (PC) is illustrated as an example of the image processing device 20 in FIG. 1, the image processing device 20 is not limited to the PC. For example, the image processing device 20 may be an information processing device such as a home video processing device (a digital versatile disc (DVD) recorder, a video cassette recorder, or the like), a personal digital assistant (PDA), a home game machine, a home appliance, or the like. In addition, the image processing device 20 may be an information processing device such as a portable telephone, a personal handy-phone system (PHS), a portable music player device, a portable video processing device, a portable game machine, or the like.

In addition, although an example in which the imaging device 10 extracts the human image 82 has been described above, the image processing device 20 can extract the human image 82. Further, a function of the above-described image processing device 20 can be implemented in the imaging device 10, and the imaging device 10 can function as the image processing device.

(Point of View of Present Disclosure)

Incidentally, it is desirable that a depth of the human image 82 be close to a depth of the foreground object 84 of the celebrity so that the human is viewed along with the celebrity when the human image 82 is combined with the foreground object 84 of the celebrity as described above.

However, it may be difficult to recognize whether or not the object is in an appropriate depth range for the image object just at a glance of a composite image of the object and the image object. For example, because there is no difference in a size of the object in the composite image when there is a small object at a shallow depth and when there is a large object at a deep depth, it is difficult to determine whether or not the object is in the appropriate depth range by the size of the object in the composite image.

An embodiment of the present disclosure has been made in view of the above-described circumstances. In accordance with the embodiment of the present disclosure, notification can be provided so that it can be easily determined whether or not the object is in an appropriate range. Hereinafter, the above-described image processing device 20 in accordance with the embodiment of the present disclosure will be described in detail.

[2. Configuration of Image Processing Device]

Figure 4:
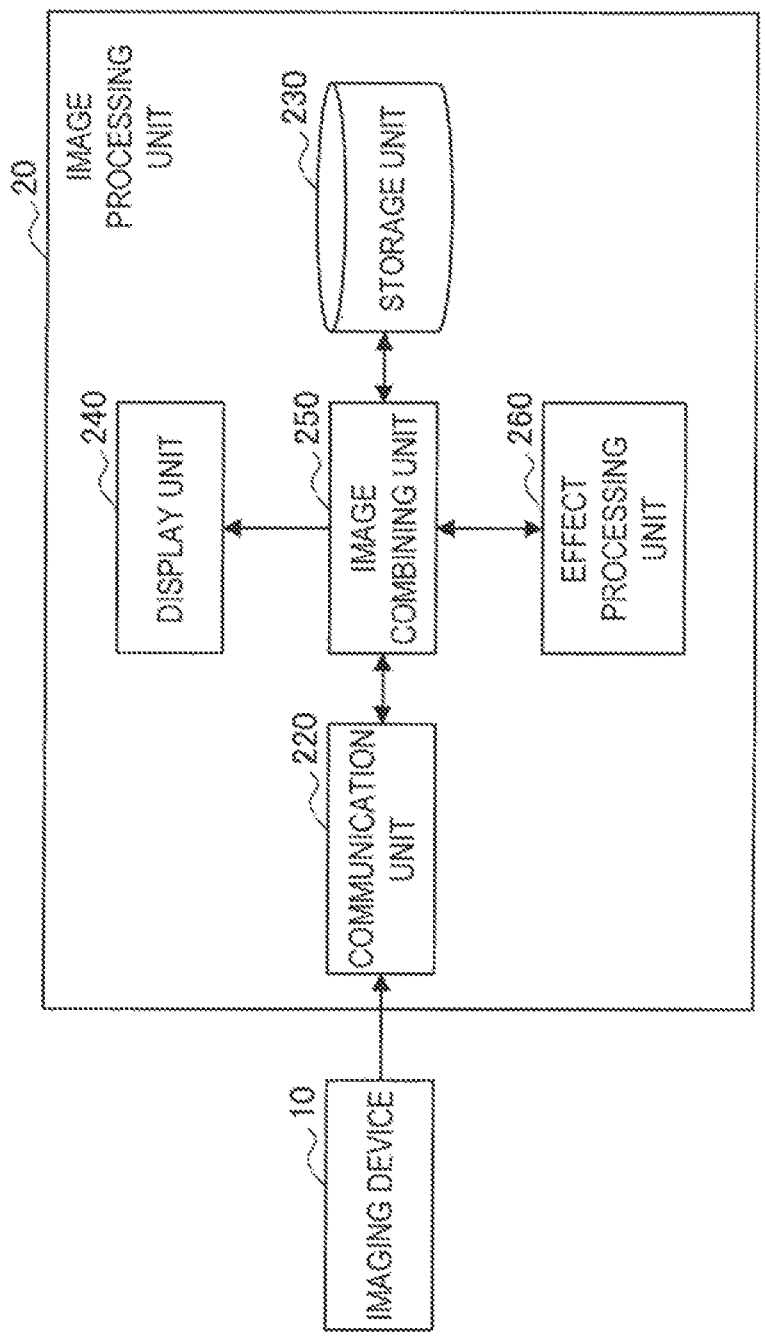
FIG. 4 is a functional block diagram illustrating a configuration of an image processing device 20 in accordance with an embodiment of the present disclosure.

FIG. 4 is a functional block diagram illustrating a configuration of the image processing device 20 in accordance with an embodiment of the present disclosure. As illustrated in FIG. 4, the image processing device 20 in accordance with the embodiment of the present disclosure includes the communication unit 220, a storage unit 230, a display unit 240, the image combining unit 250, and the effect processing unit 260.

The communication unit 220 is an interface (I/F) with the imaging device 10, and receives a human image or depth information of the human image from the imaging device 10. The communication unit 220 may establish a wireless or wired connection to the imaging device 10.

The storage unit 230 is a storage medium that stores a background image and a foreground image to be combined with the human image. In further detail, depth information is set for a foreground object included in the foreground image. Although depth information may be set for every pixel constituting the foreground object, it is mainly assumed that one piece of representative depth information is set for the foreground object in this specification. The storage unit 230 may store a composite image generated by the image combining unit 250.

The above-described storage section 230 may include a storage medium such as a nonvolatile memory, a magnetic disk, an optical disc, or a magneto-optical (MO) disc. An example of the nonvolatile memory may be a flash memory, a secure digital (SD) card, a micro SD card, a universal serial bus (USB) memory, an electrically erasable programmable ROM (EEPROM), or an erasable programmable ROM (EPROM). In addition, the magnetic disk may be a hard disk, a disc-shaped magnetic body disk, or the like. In addition, the optical disc may be a compact disc (CD), a digital versatile disc (DVD), a Blu-ray disc (BD) (registered trademark), or the like.

The display unit 240 displays the composite image generated by the image combining unit 250. Because this composite image is a composite image of the human image obtained by imaging and a virtual background image and foreground image, a user can have visual contact with the composite image displayed on the display unit 240, thereby experiencing a sense that the user is in a space different from an actual space.

The image combining unit 250 combines the human image received by the communication unit 220 with the background image and the foreground image stored in the storage unit 230. The background image and the foreground image to be combined may be selected by the user's operation. In addition, the background image and the foreground image may be supplied from an external device such as a server on a network instead of the storage unit 230.

Here, for every pixel constituting the human image, the image combining unit 250 expresses an anteroposterior relationship between the human image and the foreground object based on the depth information of the human image and the depth information of the foreground object included in the foreground image. Thereby, as illustrated in FIG. 3, it is possible to generate a realistic composite image. The foreground object may be a still image or a moving image. When the foreground object is the moving image, the depth information of the foreground object is varied with movement of the foreground object.

When the image combining unit 250 generates the composite image, the effect processing unit 260 executes effect processing if a depth of the human image is not in an appropriate range. Thereby, notification can be provided so that it can be easily determined and intuitively understood whether or not the human is in the appropriate depth range. Hereinafter, the appropriate depth range and the effect processing will be more specifically described.

(Appropriate Depth Range)

As illustrated in FIG. 3, it is desirable that a depth of a human image be close to a depth of a foreground object of a celebrity so that the human is viewed along with the celebrity. That is, it is appropriate that the depth of the human image is in a predetermined range based on the depth of the foreground object. Thus, the effect processing unit 260 may treat a range of less than a threshold value Dth from the foreground object as an appropriate depth range as illustrated in FIG. 5.

Figure 5:
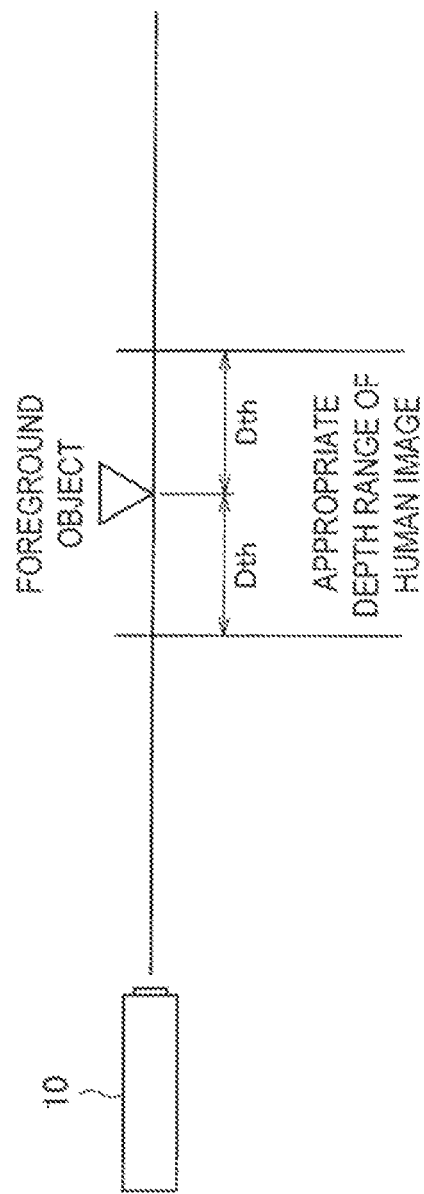
FIG. 5 is an explanatory diagram illustrating an appropriate depth range of an object.

Although the same threshold value Dth is illustrated as front and rear threshold values of the foreground object in FIG. 5, the front and rear threshold values may be different. In addition, the threshold value Dth may be a different value according to the foreground image. For example, when the depth of the foreground object is deep, an influence by the same depth difference is small as compared to when the depth of the foreground object is shallow. Thus, the effect processing unit 260 may set the threshold value Dth to a larger value as the depth of the foreground object is deeper.

(Effect Processing)

The effect processing unit 260 does not perform the effect processing when the depth of the human image is in the above-described appropriate depth range, that is, when a difference between the depth of the human image and the depth of the foreground object is less than the threshold value Dth. On the other hand, the effect processing unit 260 executes the effect processing for providing notification that the human is not in the appropriate depth range when the depth of the human image is out of the above-described appropriate depth range, that is, when the difference between the depth of the human image and the depth of the foreground object is greater than or equal to the threshold value Dth. Hereinafter, a specific example of the effect processing will be described.

Figure 6:
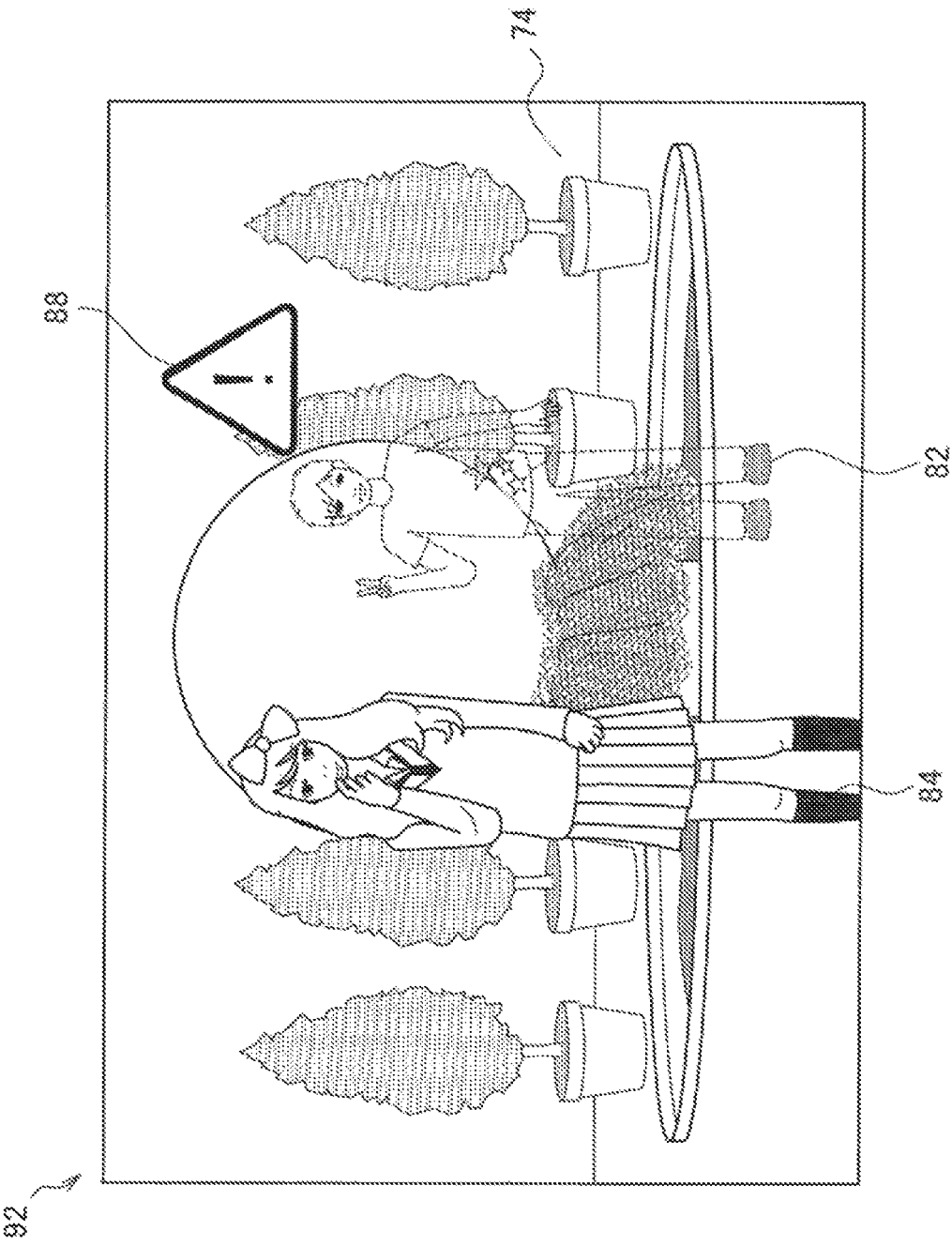
FIG. 6 is an explanatory diagram illustrating a composite image when a depth of the human image is too deep.

FIG. 6 is an explanatory diagram illustrating a composite image 92 when a depth of a human image is too deep. When a depth of a human image 82 is deeper than a depth of a foreground object 84 by the threshold value Dth or more, the effect processing unit 260 makes the human image 82 semi-transparent by applying alpha processing to the human image 82 as in the composite image 92 illustrated in FIG. 6. In addition, the effect processing unit 260 adds an alarm mark 88 for attention to the composite image 92 as illustrated in FIG. 6.

The effect processing unit 260 may perform uniform effect processing on the human image by treating a mean value of a depth of each pixel of the human image or a depth of a body part as a representative depth and comparing the representative depth of the human image to the depth of the foreground object.

Alternatively, the effect processing unit 260 may compare the depth of the human image to the depth of the foreground object in units of pixels of the human image. In this case, the alpha processing may be applied to only part of the human.

Figure 7:
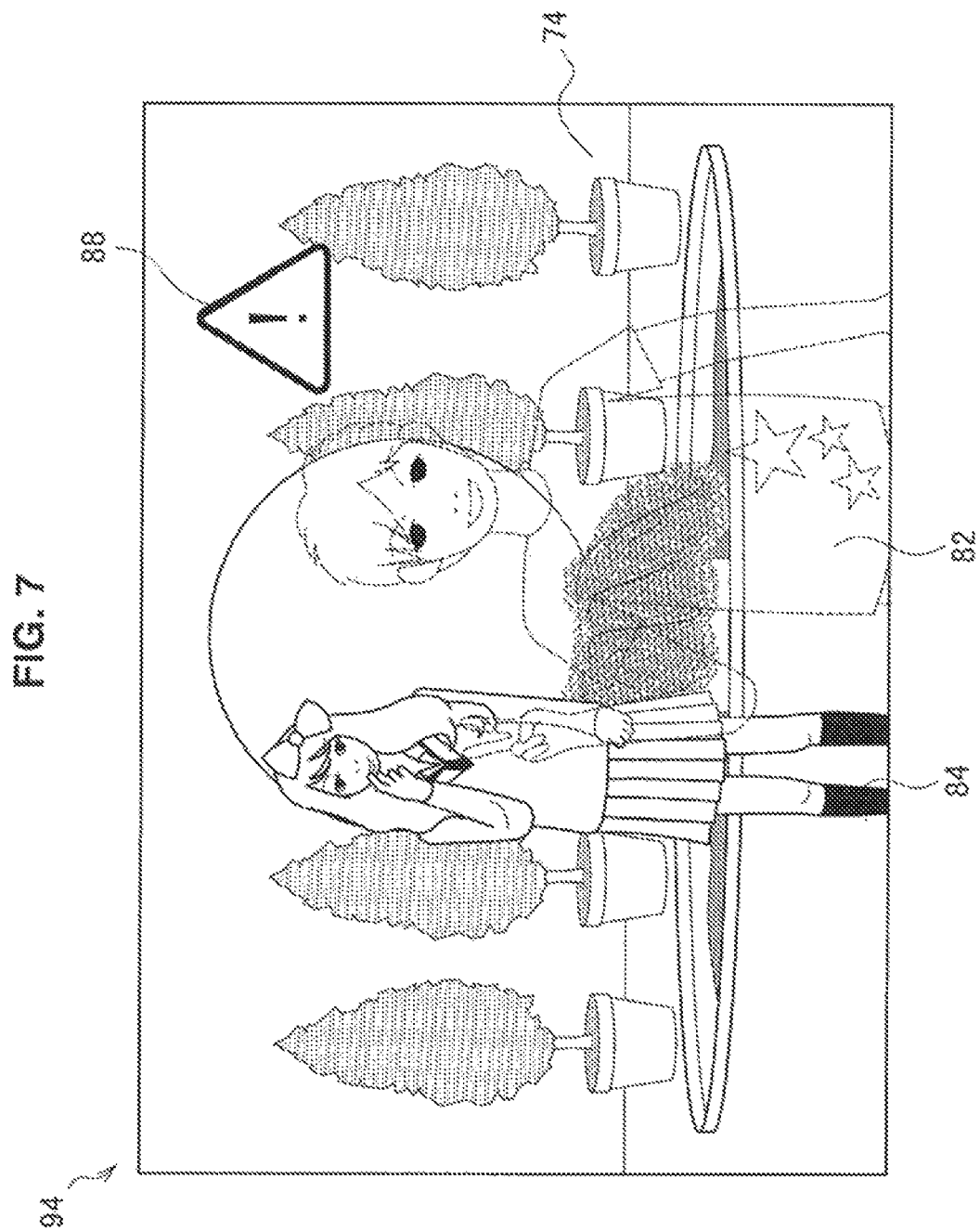
FIG. 7 is an explanatory diagram illustrating a composite image when the depth of the human image is too shallow.

FIG. 7 is an explanatory diagram illustrating a composite image 94 when a depth of a human image is too shallow. When a depth of a human image 82 is shallower than a depth of a foreground object 84 by the threshold value Dth or more as in the composite image 94 illustrated in FIG. 7, the effect processing unit 260 may make the human image 82 semi-transparent by applying alpha processing to the human image 82. In addition, the effect processing unit 260 may add an alarm mark 88 for attention to the composite image 94 as illustrated in FIG. 7.

According to visual contact with the composite images 92 and 94, the human, who is the object, is intuitively determined to be in an improper depth position and a standing position is expected to be adjusted.

When a difference between the depth of the human image and the depth of the foreground object is greater than or equal to the threshold value Dth, the effect processing unit 260 may apply stronger alpha processing as the difference between the depth of the human image and the depth of the foreground object is larger. According to this configuration, the human, who is the object, can recognize a degree of a difference between a current depth position and an appropriate depth range from the strength of the alpha processing.

In addition, although the alpha processing and the addition of the alarm mark 88 as the effect processing have been described above, the effect processing is not limited to these examples. For example, the effect processing may be a flash of the human image, contour emphasis, a hue change (for example, black-and-white forms), a blurring process, addition of a caution message, or the like.

(Application Example)

Although an example in which there is one foreground object has been described above, the embodiment of the present disclosure is applicable even when there are a plurality of foreground objects. In this case, the effect processing unit 260 may focus on only depth information of any one foreground object or depth information of the plurality of foreground objects. When focusing on the depth information of the plurality of foreground objects, the effect processing unit 260 may apply the effect processing if a difference between the depth of any one foreground object and the depth of the human image is greater than or equal to the threshold value Dth or if differences between the depths of the plurality of foreground objects and the depth of the human image are greater than or equal to the threshold value Dth.

(Supplement)

In addition, although an example in which the effect processing is applied to provide notification that a human is not in an appropriate depth range has been described above, the effect processing unit 260 may apply the effect processing when a human image and a foreground object in a composite image are separated by a predetermined distance.

Figure 8:
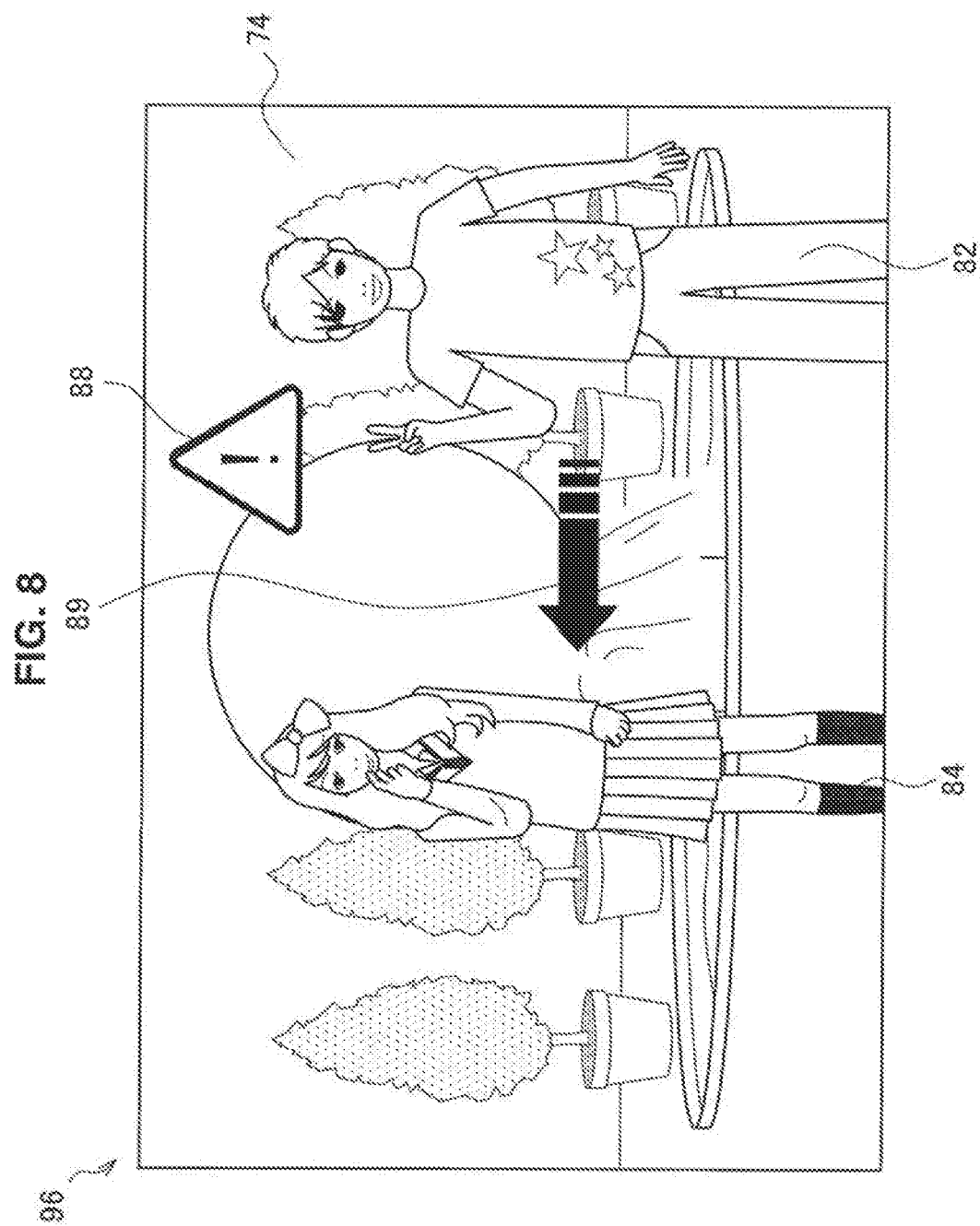
FIG. 8 is an explanatory diagram illustrating a composite image when the human image is separated from a foreground object.

FIG. 8 is an explanatory diagram illustrating a composite image 96 when a human image is separated from a foreground object. As in the composite image 96 illustrated in FIG. 8, the effect processing unit 260 may add an alarm mark 88 and an arrow image 89 for guiding movement of a human when the human image 82 is separated from the foreground object 84. Thereby, the human, who is an object, is expected to move to an appropriate position.

[3. Operation of Image Processing System]

A configuration of the image processing device 20 in accordance with an embodiment of the present disclosure has been described above. Next, the operation of the image processing system in accordance with an embodiment of the present disclosure is organized with reference to FIG. 9.

Figure 9:
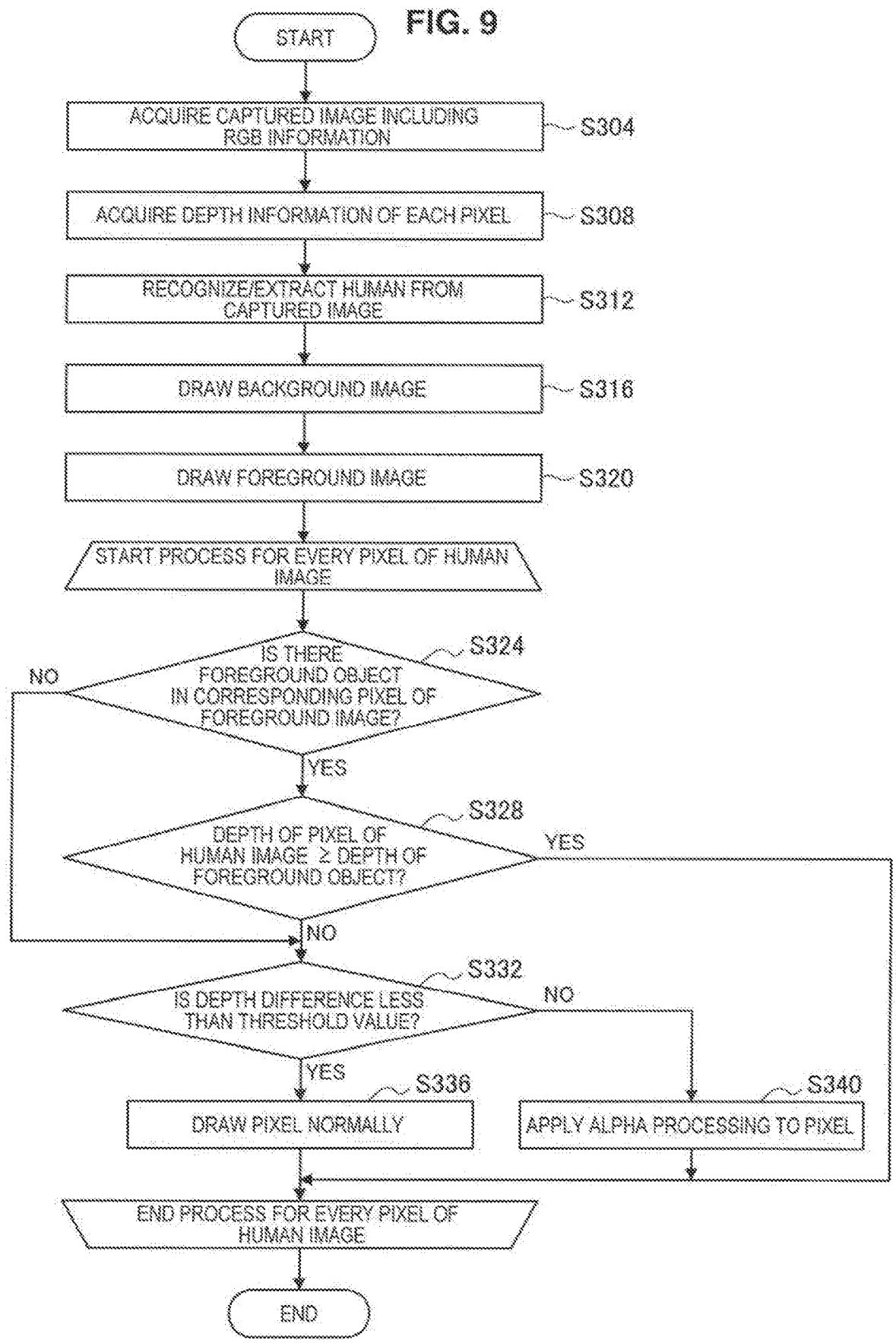
FIG. 9 is a flowchart illustrating an operation of an image processing system in accordance with an embodiment of the present disclosure.

FIG. 9 is a flowchart illustrating the operation of the image processing system in accordance with the embodiment of the present disclosure. As illustrated in FIG. 9, first, the imaging device 10 images a human, who is an object, and acquires a captured image including RGB information (S304). In addition, the imaging device 10 also acquires depth information of each pixel in the captured image (S308).

The imaging device 10 recognizes an image part of the human from the captured image to extract a human image based on the depth information of each pixel in the captured image (S312). Thereafter, the imaging device 10 transmits the extracted human image and depth information of the human image to the image processing device 20.

On the other hand, the image combining unit 250 of the image processing device 20 first draws a background image and a foreground image, for example, read from the storage unit 230 (S316 and S320). Thereafter, the image combining unit 250 performs processes of steps S324 to S340 for every pixel constituting the human image in cooperation with the effect processing unit 260.

Specifically, the image combining unit 250 determines whether or not a pixel of the foreground image corresponding to a pixel of the human image is a foreground object (S324). The process proceeds to the process of step S328 when the pixel of the foreground image is the foreground object, and the process proceeds to the process of step S332 when the pixel of the foreground image is not the foreground object.

In step S328, the image combining unit 250 determines whether or not a depth of the pixel of the human image is greater than or equal to a depth of the foreground object. When the depth of the pixel of the human image is greater than or equal to the depth of the foreground object, the pixel of the human image is not drawn. On the other hand, the process proceeds to the process of step S332 when the depth of the pixel of the human image is less than the depth of the foreground object.

In step S332, the effect processing unit 260 determines whether or not a difference between the depth of the pixel of the human image and the depth of the foreground object is less than the threshold value Dth (S332). When the difference between the depth of the pixel of the human image and the depth of the foreground object is greater than or equal to the threshold value Dth, the image combining unit 250 draws the pixel of the human image normally (S336). On the other hand, when the difference between the depth of the pixel of the human image and the depth of the foreground object is less than the threshold value Dth, the effect processing unit 260 applies alpha processing to the pixel of the human image and the image combining unit 250 draws the pixel to which the alpha processing has been applied (S340).

[4. Hardware Configuration]

Image processing by the image processing device 20 in accordance with an embodiment of the present disclosure has been described above. The image processing by the image processing device 20 described above is implemented in cooperation with hardware provided in the image processing device 20 and software. Hereinafter, an example of a hardware configuration of the image processing device 20 will be described with reference to FIG. 10.

Figure 10:
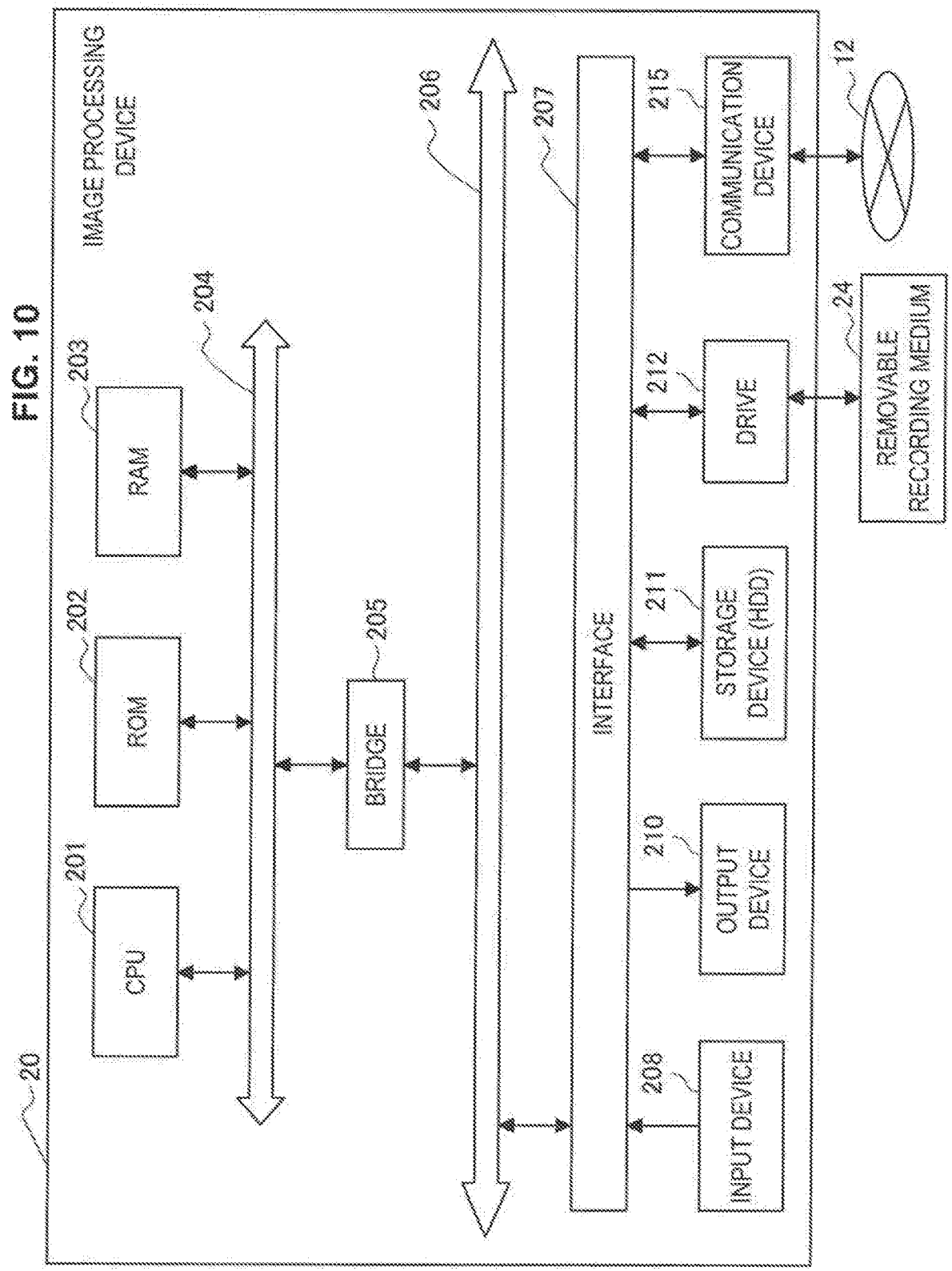
FIG. 10 is an explanatory diagram illustrating an example of a hardware configuration of the image processing device 20.

FIG. 10 is an explanatory diagram illustrating the example of the hardware configuration of the image processing device 20. As illustrated in FIG. 10, the image processing device 20 includes a central processing unit (CPU) 201, a read only memory (ROM) 202, a random access memory (RAM) 203, and a host bus 204. In addition, the image processing device 20 includes a bridge 205, an external bus 206, an I/F 207, an input device 208, an output device 210, a storage device (hard disk drive (HDD)) 211, a drive 212, and a communication device 215.

The CPU 201 functions as an arithmetic processing unit and a control unit and controls the general operation in the image processing device 20 according to various programs. In addition, the CPU 201 may be a microprocessor. The ROM 202 stores programs to be used by the CPU 201, arithmetic parameters, and the like. The RAM 203 temporarily stores programs to be used in execution of the CPU 201, parameters that vary appropriately in the execution thereof, and the like. These are mutually connected by the host bus 204 including a CPU bus and the like.

The host bus 204 is connected to the external bus 206 such as a peripheral component interconnect/interface (PCI) bus via the bridge 205. Here, it is not necessary to separately configure the host bus 204, the bridge 205 and the external bus 206, and their functions may be implemented in a single bus.

The input device 208 includes an input unit, which allows a user to input information, such as a mouse, a keyboard, a touch panel, a button, a microphone, a switch, and a lever, and an input control circuit, which generates an input signal based on the input by the user and outputs the signal to the CPU 201. The user of the image processing device 20 can input various data to the image processing device 20 or instruct the image processing device 20 to perform a processing operation by operating the input device 208.

The output device 210, for example, includes display devices such as a cathode ray tube (CRT) display device, a liquid crystal display (LCD) device, an organic light emitting diode (OLED) device, and a lamp. Further, the output device 210 includes audio output devices such as a speaker and a headphone. The output device 210, for example, outputs reproduced content. Specifically, the display device displays various information such as reproduced video data in text or images. On the other hand, the audio output device converts reproduced audio data or the like into audio and outputs the audio.

The storage device 211 is a device for data storage configured as an example of a storage unit of the image processing device 20 in accordance with this embodiment. The storage device 211 may include a storage medium, a recording device, which records data on the storage medium, a reading device, which reads the data from the storage medium, and a deleting device, which deletes the data recorded on the storage medium. The storage device 211, for example, includes an HDD. The storage device 211 drives a hard disk and stores programs to be executed by the CPU 201 and various data.

The drive 212 is a reader/writer for the storage medium and is embedded in or externally attached to the image processing device 20. The drive 212 reads information recorded on a mounted removable storage medium 24 such as a magnetic disk, an optical disc, a magneto-optical disc, or a semiconductor memory and outputs the read information to the RAM 203. In addition, the drive 212 can write information to the removable storage medium 24.

An example of the communication device 215 is a communication I/F including a communication device and the like for establishing a connection to a communication network 12. In addition, the communication device 215 may be a wireless local area network (LAN) compatible communication device, a Long Term Evolution (LTE) compatible communication device or a wired communication device, which performs wired communication.

<5. Conclusion>

As described above, the image processing device 20 in accordance with the embodiment of the present disclosure executes effect processing for providing notification that a human is not in an appropriate depth range if a difference between a depth of a human image and a depth of a foreground object is greater than or equal to a threshold value Dth when a foreground image including the foreground object, a background image, and the human image obtained by imaging are combined. According to this configuration, notification can be provided so that it can be easily determined and intuitively understood whether or not the human, who is an object, is in the appropriate depth range.

It should be understood by those skilled in the art that various modifications, combinations, sub-combinations and alterations may occur depending on design requirements and other factors insofar as they are within the scope of the appended claims or the equivalents thereof.

For example, the steps in processing of the imaging device 10 and the image processing device 20 in this specification are not necessarily processed in time series in the order described as the flowchart. For example, the steps in processing of the imaging device 10 and the image processing device 20 can also be processed in an order different from that described as the flowchart or in parallel.

In addition, a computer program for causing hardware such as the CPU 201, the ROM 202, or the RAM 203 embedded in the imaging device 10 and the image processing device 20 to implement a function equivalent to each configuration of the imaging device 10 and the image processing device 20 described above can also be created. In addition, a storage medium storing the computer program is also provided.

Additionally, the present technology may also be configured as below.

(1) An image processing device including:

a depth acquisition unit configured to acquire depth information of an object included in a captured image;

an image combining unit configured to combine the object with an image object having depth information according to each piece of the depth information; and an effect processing unit configured to execute effect processing according to the depth information of the object.

(2) The image processing device according to (1), wherein the effect processing unit executes the effect processing according to a relationship between the depth information of the image object and the depth information of the object.

(3) The image processing device according to (2), wherein the effect processing unit executes the effect processing when a difference between the depth information of the object and the depth information of the image object is greater than or equal to a threshold value.

(4) The image processing device according to (3), wherein the effect processing unit executes stronger effect processing as the difference between the depth information of the object and the depth information of the image object is larger.

(5) The image processing device according to any one of (1) to (4), wherein the effect processing unit further executes the effect processing according to a positional relationship between the image object and the object in the composite image obtained by the image combining unit.

(6) The image processing device according to any one of (1) to (5), wherein the effect processing unit executes the effect processing for each pixel constituting the object according to depth information of each pixel.

(7) An image processing method including:

acquiring depth information of an object included in a captured image;

combining the object with an image object having depth information according to each piece of the depth information; and executing effect processing according to the depth information of the object.

What is claimed is:

1. An image-processing system, comprising:
a sensor configured to detect a real position of a first living object, wherein the real position is associated with a display device in a depth direction in a real space; and
circuitry configured to:
acquire a first living-object image representing the first living object and a second living-object image representing a second living object different from the first living object, wherein
the second living-object image is a foreground image,
first depth information of the first living-object image is based on the detected real position, and
second depth information of the second living-object image corresponds to the second living object located in a virtual space;
control the display device for display of a composite image of the first living-object image, the second living-object image, and a background image that is in the virtual space;
compare the first depth information and the second depth information to determine that a depth distance between the first living-object image and the second living-object image is larger than a threshold distance in the virtual space;
set the threshold distance based on a depth of the second living-object image;
set the threshold distance based on a depth of the foreground image in the composite image, wherein
a second value of the threshold distance for a second depth of the foreground image in the composite image is larger than a first value of the threshold distance for a first depth of the foreground image in the composite image, and
the second depth is deeper than the first depth; and
control the display device to:
display an effect image based on the determination that the depth distance is larger than the threshold distance in the virtual space; and
change the first depth information based on a movement of the first living object.

2. The image-processing system according to claim 1, wherein the effect image includes a first effect image that extends towards the second living-object image.

3. The image-processing system according to claim 2, wherein the first effect image has an arrow shape that points at the second living-object image.

4. The image-processing system according to claim 2, wherein
the effect image further includes a second effect image,
the first effect image extends from the first living-object image towards the second living-object image in a direction perpendicular to the depth direction, and
the second effect image includes a message image associated with an annotation.

5. The image-processing system according to claim 1, wherein the first living-object image and the second living-object image correspond to humans located in different spaces.

6. The image-processing system according to claim 1, wherein the circuitry is further configured to control the display device to concurrently display the composite image and the effect image.

7. The image-processing system according to claim 6, wherein the sensor comprises an imaging device configured to:
capture a sample image of the real space; and
determine the first depth information based on the captured sample image.

8. The image-processing system according to claim 1, wherein the effect image comprises an alert image associated with an annotation.

9. An image-processing method, comprising:
detecting, using a depth sensor, a real position of a first living object, wherein the real position is associated with a display device in a depth direction in a real space;
acquiring a first living-object image representing the first living object and a second living-object image representing a second living object different from the first living object, wherein
the second living-object image is a foreground image,
first depth information of the first living-object image is based on the detected real position, and
second depth information of the second living-object image corresponds to the second living object located in a virtual space;
controlling the display device for display of a composite image of the first living-object image, the second living-object image, and a background image that is in the virtual space;
comparing the first depth information and the second depth information to determine that a depth distance between the first living-object image and the second living-object image is larger than a threshold distance in the virtual space;
setting the threshold distance based on a depth of the second living-object image;
setting the threshold distance based on a depth of the foreground image in the composite image, wherein
a second value of the threshold distance for a second depth of the foreground image in the composite image is larger than a first value of the threshold distance for a first depth of the foreground image in the composite image, and
the second depth is deeper than the first depth; and
controlling the display device to:
display an effect image based on the determination that the depth distance is larger than the threshold distance in the virtual space; and
change the first depth information based on a movement of the first living object.

10. A non-transitory computer-readable medium having stored thereon, computer-executable instructions which, when executed by a computer, cause the computer to execute operations, the operations comprising:
detecting a real position of a first living object, wherein the real position is associated with a display device in a depth direction in a real space;
acquiring a first living-object image representing the first living object and a second living-object image representing a second living object different from the first living object, wherein
  the second living-object image is a foreground image,
  first depth information of the first living-object image is based on the detected real position, and
  second depth information of the second living-object image corresponds to the second living object located in a virtual space;
controlling the display device for display of a composite image of the first living-object image, the second living-object image, and a background image that is in the virtual space;
comparing the first depth information and the second depth information to determine a depth distance between the first living-object image and the second living-object image is larger than a threshold distance in the virtual space;
setting the threshold distance based on a depth of the second living-object image;
setting the threshold distance based on a depth of the foreground image in the composite image, wherein
  a second value of the threshold distance for a second depth of the foreground image in the composite image is larger than a first value of the threshold distance for a first depth of the foreground image in the composite image, and
  second depth is deeper than the first depth; and
controlling the display device to:
  display an effect image based on the determination that the depth distance is larger than the threshold distance in the virtual space; and
  change the first depth information based on a movement of the first living object.

11. The image-processing system according to claim 1, wherein the effect image corresponds to at least one of a flash, contour emphasis, a hue change, or a blur of the first living-object image.

12. The image-processing system according to claim 1, wherein each of the first living object and the second living object is a human, a plant or an animal not including the human.

* * * * *